(12) United States Patent
Eguchi et al.

(10) Patent No.: US 10,215,239 B2
(45) Date of Patent: Feb. 26, 2019

(54) CLUTCH OPERATING DEVICE

(75) Inventors: Yasuhiko Eguchi, Yao (JP); Hiroaki Kato, Neyagawa (JP)

(73) Assignee: EXEDY Corporation, Osaka (JP)

(*) Notice: Subject to any disclaimer, the term of this patent is extended or adjusted under 35 U.S.C. 154(b) by 734 days.

(21) Appl. No.: 14/002,025

(22) PCT Filed: Feb. 2, 2012

(86) PCT No.: PCT/JP2012/052395
§ 371 (c)(1),
(2), (4) Date: Aug. 28, 2013

(87) PCT Pub. No.: WO2012/117804
PCT Pub. Date: Sep. 7, 2012

(65) Prior Publication Data
US 2013/0334004 A1    Dec. 19, 2013

(30) Foreign Application Priority Data

Mar. 3, 2011 (JP) ................................ 2011-046297

(51) Int. Cl.
| | |
|---|---|
| *F16D 43/04* | (2006.01) |
| *F16D 23/12* | (2006.01) |
| *F16D 28/00* | (2006.01) |
| *F16D 23/14* | (2006.01) |

(52) U.S. Cl.
CPC .............. *F16D 43/04* (2013.01); *F16D 23/12* (2013.01); *F16D 28/00* (2013.01); *F16D 2023/126* (2013.01); *F16D 2023/141* (2013.01)

(58) Field of Classification Search
CPC ............... F16D 28/00; F16D 2023/126; F16D 2023/123; F16D 2500/1025; F16D 23/12; F16D 43/04; F16D 2023/141; F16D 2500/1023; F16D 2500/1045
See application file for complete search history.

(56) References Cited

U.S. PATENT DOCUMENTS 3,815,435 A * 6/1974 Eschenbacher ..... F16H 25/2223
                                                     74/424.87
5,267,635 A * 12/1993 Peterson ............... F16D 48/064
                                                        192/84.6
(Continued)

FOREIGN PATENT DOCUMENTS

CN  201246425 Y  5/2009
CN  101508242 A  8/2009
(Continued)

OTHER PUBLICATIONS

Push rod type clutch apparatus. (n.d.). Retrieved Mar. 27, 2016, from https://patents.google.com/patent/CN201246425Y/en.*

*Primary Examiner* — Mark A Manley
(74) *Attorney, Agent, or Firm* — Global IP Counselors, LLP

(57) ABSTRACT

The present clutch operating device includes a drive motor and a speed reduction mechanism. The speed reduction mechanism includes a link bar receiving a driving force of the drive motor, a clutch lever that is rotatably coupled to a first end of the link bar while being disposed rotatably with respect to a second cover, and a main roller that is rotatably attached to a second end of the link bar while being disposed to roll on the second cover.

12 Claims, 14 Drawing Sheets

(56) References Cited

U.S. PATENT DOCUMENTS

| | | | | | |
|---|---|---|---|---|---|
| 5,353,902 | A | * | 10/1994 | Flowtow | F16D 23/12 192/84.6 |
| 5,881,853 | A | * | 3/1999 | Peuster | F16D 28/00 192/3.56 |
| 5,954,178 | A | * | 9/1999 | Fischer | F16D 28/00 192/84.6 |
| 8,887,885 | B2 | * | 11/2014 | Lee | F16D 23/12 192/48.2 |
| 2012/0291580 | A1 | * | 11/2012 | Kim | F16D 23/12 74/473.12 |

FOREIGN PATENT DOCUMENTS

| | | | | | |
|---|---|---|---|---|---|
| EP | 2551544 | A1 | * | 1/2013 | F16D 23/12 |
| GB | 2313885 | A | | 12/1997 | |
| JP | 2006-010033 | A | | 1/2006 | |
| JP | 2010-190393 | A | | 9/2010 | |
| WO | WO-03076827 | A2 | * | 9/2003 | F16D 13/752 |

* cited by examiner

CLUTCH OPERATING DEVICE

CROSS-REFERENCE TO THE RELATED APPLICATIONS

This U.S. National stage application claims priority to Japanese Patent Application No. 2011-046297 filed in Japan on Mar. 3, 2011. The entire disclosure Japanese Patent Application No. 2011-046297 is hereby incorporated herein by reference.

TECHNICAL FIELD

The present invention relates to a clutch operating device for operating a clutch device.

BACKGROUND ART

In well-known manual transmissions, a clutch device is disposed between an engine and a transmission, while a shift lever of a driver's seat and the transmission are mechanically coupled through a link mechanism such as a control rod. In gear shifting, the shift lever is operated while a clutch pedal is pressed down for causing the clutch device to block transmission of power to be executed between the engine and the transmission. Therefore, when gear shifting is frequently required, a series of operations become a large burden on a driver.

In view of the above, to reduce the driver's burden regarding a shift operation, automatic transmissions, provided with a clutch actuator automatically engaging/disengaging a clutch device, have been proposed whereby a gear shifting operation can be executed without pressing down a clutch pedal.

CITATION LIST

Patent Literature

PTL 1: Specification of U.K. Patent Application Publication No. 2313885

SUMMARY

Technical Problems

Normal closed type clutch devices are generally used as clutch devices for the aforementioned automatic transmissions. However, automatic transmissions using a normal open type clutch device have also been developed in recent years.

In the case of the normal open type, the clutch device is disengaged while operating force is not being applied to the clutch device from a clutch operating device. In engaging the clutch device, a pressure plate is pressed by a drive mechanism through a lever and a clutch disc is interposed between the pressure plate and a flywheel. As a result, power is transmitted to an input shaft of a transmission through the clutch disc.

With such structure unlike the normal close type, in the normal open type clutch device, the pressing force acting on the clutch disc (clutch load) depends on the operating force to be transmitted thereto from the clutch operating device. Therefore, a large operating force is required in a clutch engaged state, and consequently, the load of the actuator is inevitably increased.

In view of the above, an assist mechanism for assisting the operating force has been proposed to reduce the load of the actuator (see e.g., Patent Literature 1). The assist mechanism described in Patent Literature 1 is configured to generate assist force using a cam.

In using the cam, however, the cam is required to be designed suitably for a product in accordance with the specification of the product. Therefore, it is difficult to make the cam compatible with a variety of clutch devices.

Meanwhile, reduction in cost of the clutch operating device has been increasingly demanded.

It is an object of the present invention to provide a clutch operating device whereby manufacturing cost can be reduced while drive load can be reduced.

Solution to Problems

A clutch operating device according to the present invention includes a drive part and a speed reduction mechanism. The drive part includes a guide part and is configured to generate a driving force. The speed reduction mechanism is a toggle mechanism for amplifying the driving force of the drive unit and includes: a first link member receiving the driving force of the drive unit; a second link member that is rotatably coupled to a first end of the first link member while being disposed rotatably with respect to the guide part; and a roller member that is rotatably attached to a second end of the first link member while being disposed to roll on the guide part.

DETAILED DESCRIPTION OF THE PREFERRED EMBODIMENTS

[First Embodiment]

<Structure of Clutch Device 9>

Figure 1:
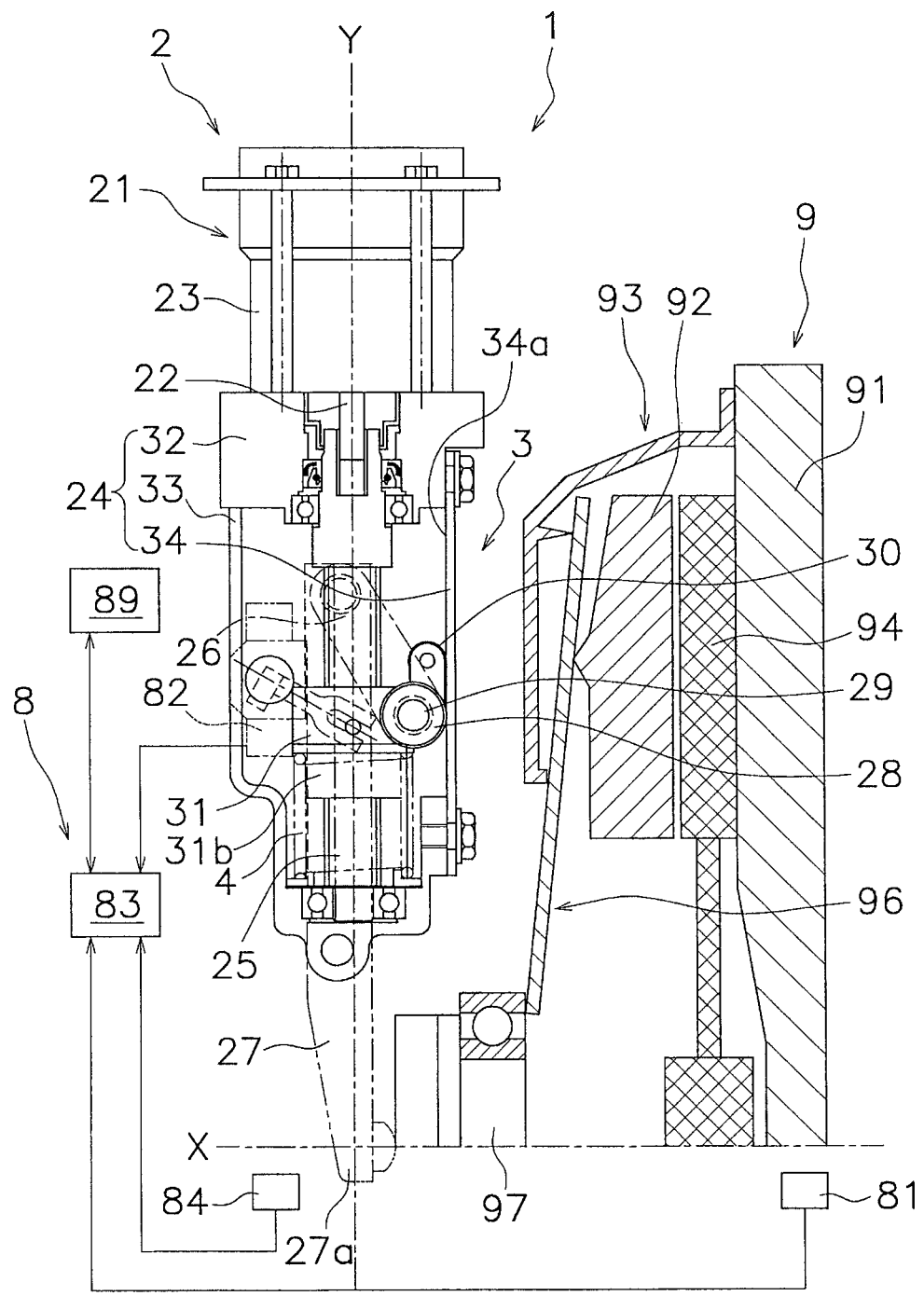
FIG. 1 is a schematic structural view of a clutch device 9 and a clutch operating device 1 (a first exemplary embodiment).

A clutch device 9 illustrated in FIG. 1 is an exemplary device for transmitting power from an engine (not illustrated in the figures) to a transmission (not illustrated in the figures) and is, for instance, fixed to a flywheel 91 of the engine. The flywheel 91 is rotated about a rotational axis X. An axial direction hereinafter refers to a direction arranged in parallel to the rotational axis X.

The clutch device 9 is so-called a normal open type device. Therefore, power is blocked from being transmitted from the engine to the transmission, while operating force is not being applied to the clutch device 9 from a clutch operating device 1 (to be described). The clutch operating device 1 will be described below in detail.

As illustrated in FIG. 1, the clutch device 9 includes a clutch cover 93, a pressure plate 92, a clutch disc 94, a pressure lever 96 and an engaging bearing 97.

The clutch cover 93 is fixed to the flywheel 91. The pressure plate 92 is supported by the clutch cover 93 while being unitarily rotatable therewith and axially movable. The pressure plate 92 is coupled to the clutch cover 93 by a plurality of strap plates (not illustrated in the figures) while being unitarily rotatable therewith. Further, the pressure plate 92 is elastically coupled to the clutch cover 93 in the axial direction by the strap plates.

The clutch disc 94 is disposed between the flywheel 91 and the pressure plate 92, and is interposed axially between the flywheel 91 and the pressure plate 92 when the clutch device 9 is engaged. The pressure lever 96 is a substantially annular plate, and is supported by the clutch cover 93 while being elastically deformable in the axial direction. The pressure lever 96 has small elastic force, and requires relatively small force when being elastically deformed. The inner peripheral part of the pressure lever 96 can be axially pressed inside by a clutch lever 27 (to be described) of the clutch operating device 1.

The engaging bearing 97 eliminates difference in rotation between the pressure lever 96 and the clutch lever 27. The engaging bearing 97 is disposed between the inner peripheral part of the pressure lever 96 and the tip of the clutch lever 27. Further, when axially pressed by the clutch operating device 1, the engaging bearing 97 is configured to transmit the operating force of the clutch operating device 1 to the inner peripheral part of the pressure lever 96.

<Structure of Clutch Operating Device 1>

The clutch operating device 1 (an exemplary clutch operating device) is a device for operating the clutch device 9, and switches the clutch device 9 into either a power transmitted state or a power blocked state, for instance, based on an operating signal to be outputted from a transmission ECU 89. Here, the power blocked state means a state that transmission of power through the clutch device 9 is being completely blocked, whereas the power transmitted state means a state that transmission of power through the clutch device 9 is being executed. In the power transmitted state, the rotational speed of the flywheel 91 and that of an input shaft (not illustrated in the figures) of the transmission are the same. FIG. 1 illustrates the power blocked state.

The clutch operating device 1 can be applied to a variety of clutch devices with different specifications. However, the clutch operating device 1 will be herein explained by exemplifying the aforementioned clutch device 9 as an operating target of the clutch operating device 1.

As illustrated in FIG. 1, the clutch operating device 1 includes a drive unit 2 and a control unit 8.

(1) Drive Unit 2

Figure 2:
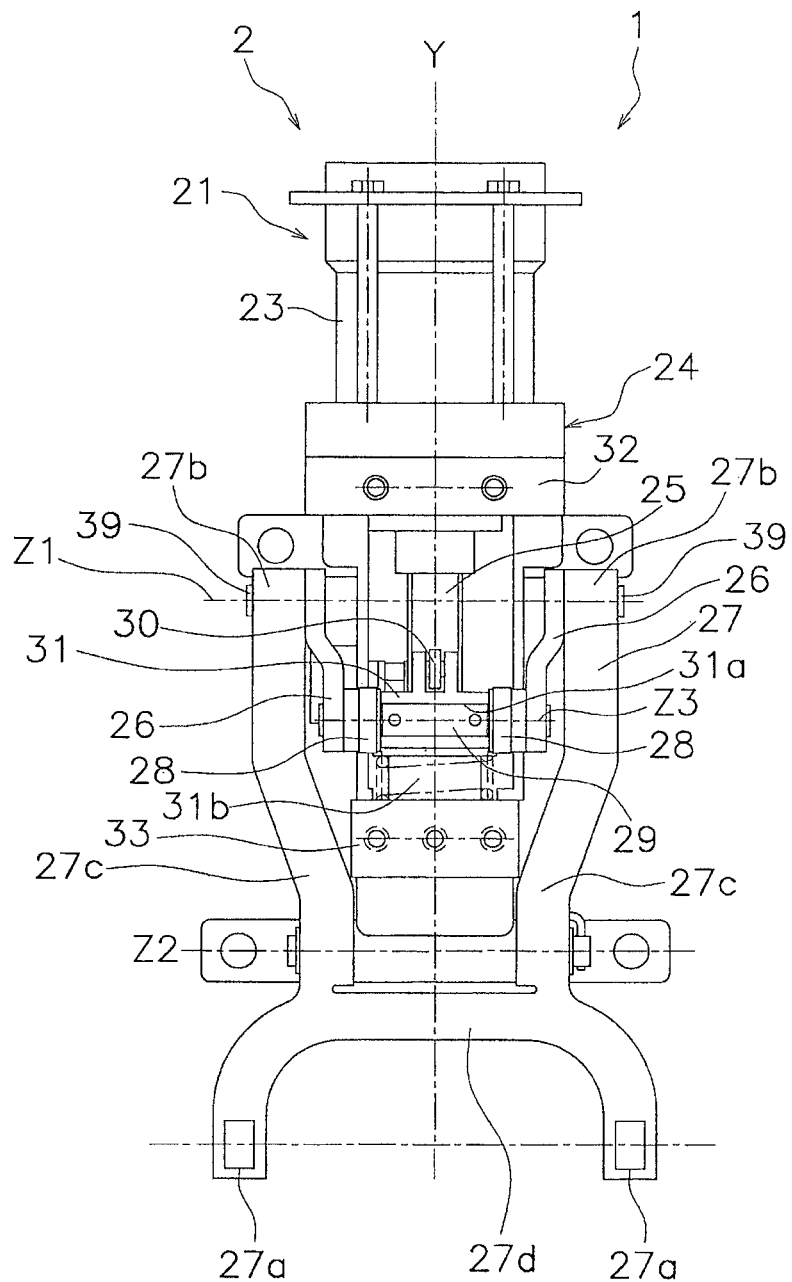
FIG. 2 is a plan view of a drive unit 2 (the first exemplary embodiment).
Figure 3:
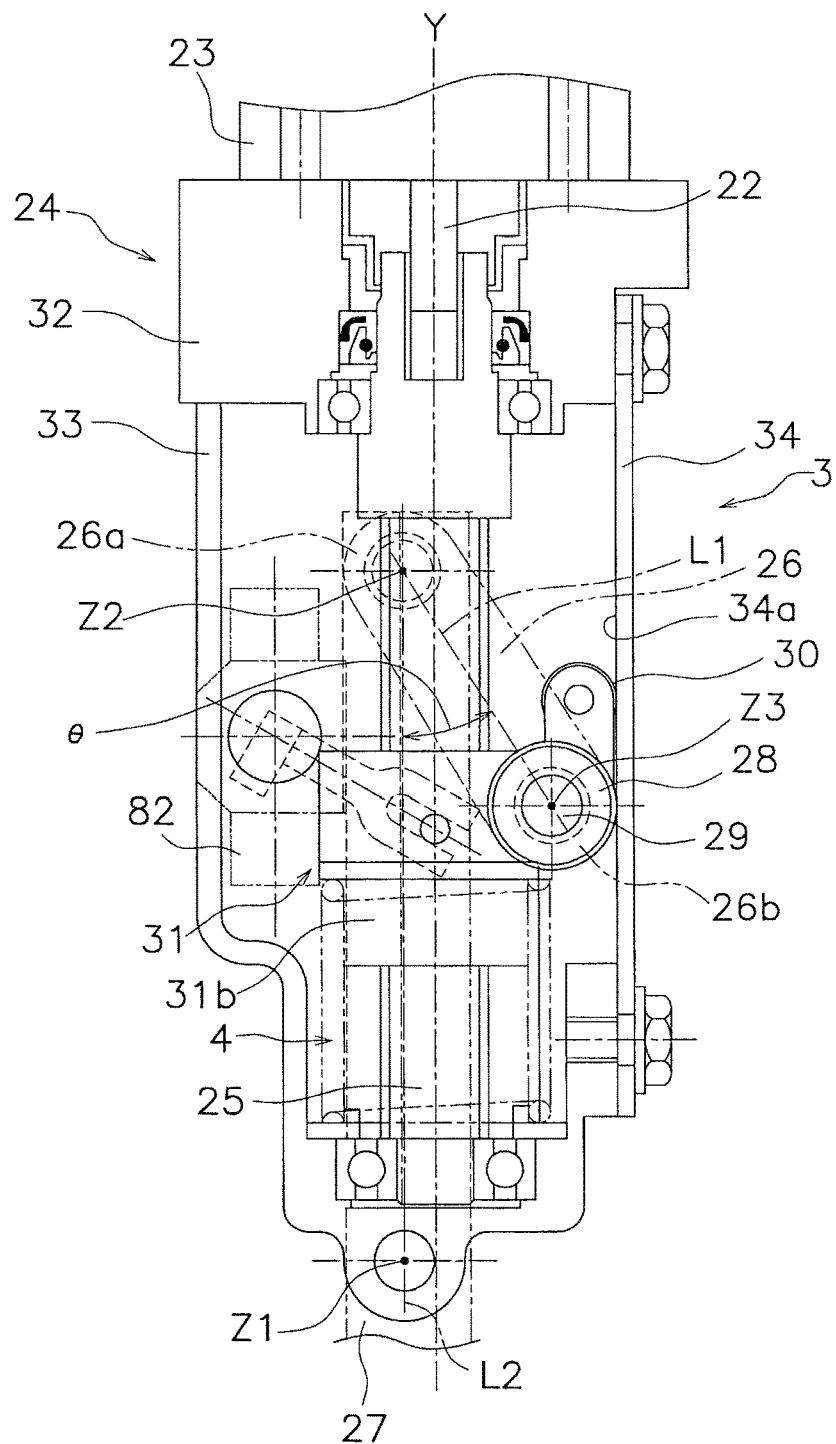
FIG. 3 is a partial enlarged view of the drive unit 2 (the first exemplary embodiment).

As illustrated in FIGS. 1 to 3, the drive unit 2 includes a drive motor 21 (an exemplary drive part), a speed reduction mechanism 3 (an exemplary speed reduction mechanism) and an assist spring 4 (an exemplary elastic member). The drive unit 2 is fixed to, for instance, a transmission case (not illustrated in the figures).

The drive motor 21 generates driving force for operating the clutch device 9. Specifically, the drive motor 21 includes a motor main body 23, a ball screw 25 (an exemplary ball screw), a drive nut 31 (an exemplary driven member) and a motor case 24 (an exemplary support member). The motor main body 23 and the ball screw 25 form a drive actuator for generating driving force. It should be noted that the drive motor 21 may be a geared motor.

The motor main body 23 generates rotational driving force. The motor main body 23 includes an output shaft 22 for outputting the rotational driving force. The motor main body 23 is fixed to the motor case 24. The motor case 24 is fixed to the transmission case.

The motor case 24 includes a flange 32, a first cover 33 and a second cover 34. The motor main body 23 is fixed to the flange 32. The upper end of the ball screw 25 is rotatably supported by the flange 32. The first cover 33 is fixed to the flange 32. The second cover 34 (an exemplary guide part) is fixed to the flange 32 and the first cover 33 by bolts. The second cover 34 has a guide surface 34a (an exemplary guide surface) disposed substantially in parallel to a first direction. The guide surface 34a makes contact with main rollers 28 (to be described) and an auxiliary roller 30 (to be described).

The ball screw 25 is coupled to the output shaft 22 of the motor main body 23. For example, the output shaft 22 is spline-coupled to the upper end of the ball screw 25. The lower end of the ball screw 25 is supported by the first cover 33 while being rotatable about a rotational axis Y. The ball screw 25 is driven and rotated by the motor main body 23 through the output shaft 22. In the present exemplary embodiment, the rotational axis Y is arranged in parallel to the first direction.

The outer periphery of the ball screw 25 is threaded. The drive nut 31 is screwed onto the ball screw 25. As described below, the drive nut 31 is disposed while being prevented from rotating with respect to the motor case 24. When the ball screw 25 is driven and rotated by the motor main body 23, the drive nut 31 is guided by the ball screw 25 in the first direction. Thus, the rotational driving force generated by the motor main body 23 is converted into first directional force. The first directional force is transmitted to the speed reduction mechanism 3 through the drive nut 31.

The speed reduction mechanism 3 is provided for amplifying the force transmitted thereto from the drive nut 31. The speed reduction mechanism 3 includes the clutch lever 27 (an exemplary second link member), a pair of link bars 26 (an exemplary first link member), a coupling pin 29, a pair of the main rollers 28 (an exemplary roller member) and the auxiliary roller 30.

Figure 4:
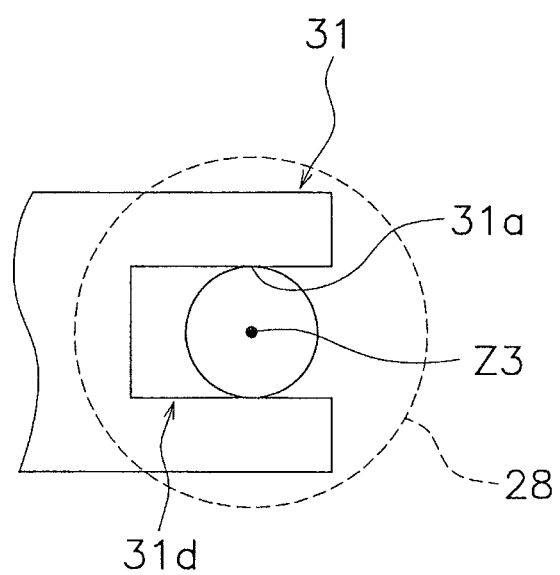
FIG. 4 is a partial enlarged view of the drive unit 2 (the first exemplary embodiment).

The driving force generated by the motor main body 23 is transmitted to the coupling pin 29 through the drive nut 31. Specifically, as illustrated in FIG. 4, the coupling pin 29 is inserted into a recess 31a of the drive nut 31. The recess 31a is a groove formed in a rectangular shape in a side view, whereas the coupling pin 29 has a circular cross-section. The dimension of the recess 31a in the first direction is set to be substantially the same as the diameter of the coupling pin 29 so as to prevent axial force from acting between the coupling pin 29 and the drive nut 31. However, the axial dimension of the recess 31a is set to be greater than the diameter of the coupling pin 29. A clearance 31d is reliably produced axially between the coupling pin 29 and the drive nut 31. In other words, the coupling pin 29 is driven by the drive nut 31 in the first direction, but is movable with respect to the drive nut 31 in a second direction. Therefore, the first directional force is transmitted from the drive nut 31 to the coupling pin 29, whereas the axial force is not. As illustrated in FIG. 3, in the present exemplary embodiment, the center of the coupling pin 29 is displaced from the rotational axis Y when seen in a direction arranged in parallel to a rotational axis Z1. In more detail, the center of the coupling pin 29 is disposed closer to the second cover 34 than the rotational axis Y is.

As illustrated in FIGS. 1 to 3, the pair of main rollers 28 is rotatably supported by the coupling pin 29. The main rollers 28 are rotatable about a rotational axis Z3. In the first exemplary embodiment, the rotational axis Z3 of the main rollers 28 is disposed closer to the second cover 34 than the rotational axis Y is. The main rollers 28 are interposed between the drive nut 31 and the link bars 26. The main rollers 28 are disposed such that they can roll on the guide surface 34a of the second cover 34 along the first direction. When operating force acts on the clutch device 9 through the speed reduction mechanism 3, its reactive force is applied to the second cover 34 from the main rollers 28. Therefore, in the action of the drive unit 2, the main rollers 28 roll on the second cover 34 while being pressed thereto.

As illustrated in FIGS. 1 to 3, the auxiliary roller 30 is rotatably supported by the drive nut 31. The auxiliary roller 30 has an outer diameter less than that of the main rollers 28. Similarly to the main rollers 28, the auxiliary roller 30 is disposed such that it can roll on the guide surface 34a of the second cover 34 along the first direction. In the present exemplary embodiment, the auxiliary roller 30 is disposed closer to the motor main body 23 than the main rollers 28 is.

The pair of link bars 26 is provided for transmitting the driving force of the drive motor 21 to the clutch lever 27. First ends 26a of the link bars 26 are respectively rotatably coupled to second ends 27b of the clutch lever 27 by pins 39. The link bars 26 are coupled to the clutch lever 27 while being rotatable about the rotational axis Z2. The second ends 26b of the link bars 26 are respectively coupled to the both ends of the coupling pin 29. The pair of link bars 26, the pair of main rollers 28 and the drive nut 31 are interposed between portions of the clutch lever 27.

The clutch lever 27 is provided for transmitting operating force to the engaging bearing 97 of the clutch device 9. The clutch lever 27 is rotatably supported by the motor case 24 of the drive motor 21. Specifically, the clutch lever 27 is supported by the first cover 33 while being rotatable about a rotational axis Z1. In the present exemplary embodiment, the rotational axis Z3 of the main rollers 28 is disposed closer to the rotational axis Z1 than the rotational axis Z2 is. Further in FIG. 3, where a straight line connecting the rotational axes Z3 and Z2 is defined as a straight line L1 while a straight line connecting the rotational axes Z1 and Z2 is defined as a straight line L2, an angle θ formed by the straight lines L1 and L2 is substantially 45 degrees and is thus less than 90 degrees.

As illustrated in FIG. 2, the clutch lever 27 has a pair of lever portions 27c and an intermediate portion 27d that couples the pair of lever portions 27c. Each lever portion 27c has a first end 27a and the second end 27b. Each first end 27a makes contact with the engaging bearing 97. Each second end 27b is rotatably coupled to each link bar 26 by each pin 39.

Figure 5:
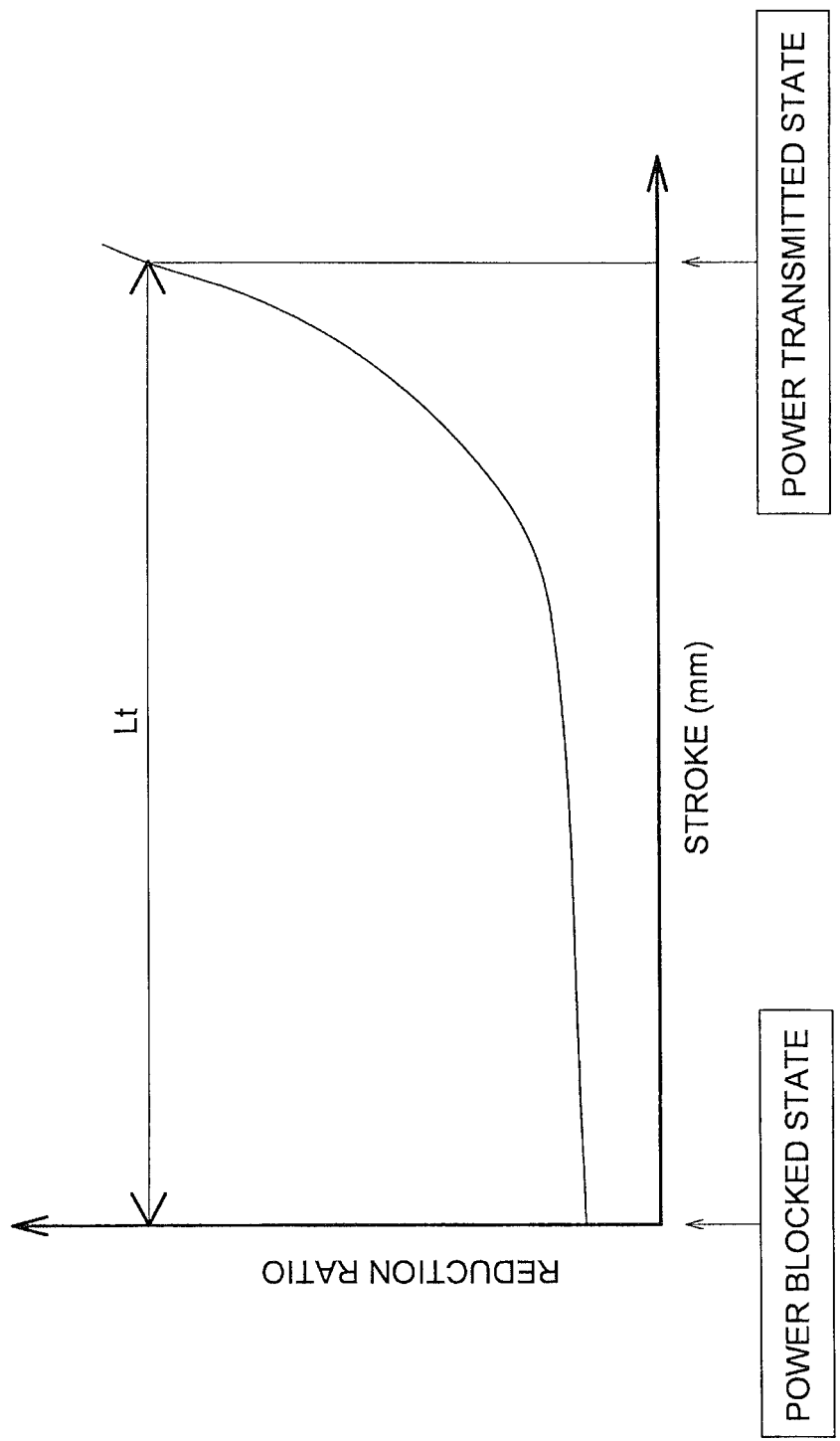
FIG. 5 represents a reduction ratio characteristic of a speed reduction mechanism 3 (the first exemplary embodiment).

The speed reduction mechanism 3 is a toggle mechanism for amplifying the driving force generated by the drive motor 21, and is also referred to as a terminal speed reduction mechanism. In the speed reduction mechanism 3, the reduction ratio varies in accordance with the input driving amount (more specifically, the displacement of the drive nut 31). Specifically, as represented in FIG. 5, the reduction ratio of the speed reduction mechanism 3 is gradually increased from the power blocked state to the power transmitted state of the clutch device 9, and is acutely increased in a terminal stroke range Lt. Further, the reduction ratio of the speed reduction mechanism 3 is gradually increased by an increase rate from the power blocked state to the power transmitted state. The increase rate is gradually increased from the power blocked state to the power transmitted state. Therefore, the action of the clutch device 9 is further smoothly performed when the state of the clutch device 9 transitions from the power blocked state to the power transmitted state.

As illustrated in FIGS. 1 to 3, the assist spring 4 is provided for assisting the driving force of the drive motor 21. The assist spring 4 is disposed between the drive nut 31 and the motor case 24 (more specifically, between the drive nut 31 and the first cover 33) while being preliminarily compressed. The assist spring 4 constantly applies pressing force to the drive nut 3 in the direction that the clutch device 9 is engaged.

The ball screw 25 is inserted into the assist spring 4. One end of the assist spring 4 is fitted into a support portion 31b of the drive nut 31. The drive nut 31 is constantly pressed upwards by the assist spring 4. Therefore, when the drive nut 31 is driven by the drive motor 21 and driving force is thereby transmitted from the drive nut 31 to the link bars 26, the pressing force of the assist spring 4 is also transmitted to the link bars 26 through the drive nut 31. When the clutch device 9 is switched from the power blocked state to the power transmitted state, the pressing force of the assist spring 4 is added to operating force to be transmitted to the clutch device 9.

(2) Control Unit 8

As illustrated in FIG. 1, the control unit 8 includes a controller 83, a first rotation sensor 81, a second rotation sensor 84 and a stroke sensor 82. The controller 83 is configured to control the drive motor 21 in accordance with a driving state of a vehicle. For example, the controller 83 is configured to control the drive motor 21 based on an operating signal to be outputted from the transmission ECU 89.

The first rotation sensor 81 detects the rotational speed of the flywheel 91. The second rotation sensor 84 detects the rotational speed of an input shaft 99 that is unitarily rotated with the clutch disc 94. The stroke sensor 82 detects the displacement of the drive nut 31. The controller 83 is configured to calculate the stroke of the clutch lever 27 based on the detection result of the stroke sensor 82.

The controller 83 is electrically connected to the first rotation sensor 81, the second rotation sensor 84 and the stroke sensor 82. The detection signals of the first rotation sensor 81, the second rotation sensor 84 and the stroke sensor 82 are configured to be inputted into the controller 83 at a predetermined period. The controller 83 is configured to control the action of the drive motor 21 using the respective detection signals. The stroke sensor 82 is fixed to the first cover 33 of the motor case 24, and detects the absolute position of the drive nut 31 with respect to the motor case 24. The controller 83 is able to grasp the rotational position of the clutch lever 27 based on the detection result of the stroke sensor 82, and is further able to calculate the displacement of the drive nut 31 (i.e., the axial driven amount of the engaging bearing 97 by the clutch lever 27).

In clutch releasing, when receiving an operating signal outputted from the transmission ECU 89, the controller 83 is configured to control the driving of the drive motor 21 so that the clutch lever 27 can be rotated to a predetermined releasing position. The controller 83 is configured to determine whether or not the clutch lever 27 is located in the predetermined position based on the detection signal of the stroke sensor 82.

In clutch engaging, in contrast, the controller 83 is configured to control the driving of the drive motor 21 so that the clutch lever 27 can be rotated to an engaging position. In the present exemplary embodiment, whether or not the clutch lever 27 is located in the engaging position is determined based on whether or not the rotational speed of the flywheel 91 and that of the input shaft 99 are substantially the same. In the present exemplary embodiment, the rotational speed of the flywheel 91 and that of the input shaft 99 are determined based on the detection signal of the first rotation sensor 81 and that of the second rotation sensor 84.

<Action of Clutch Operating Device 1>

Explanation will be made for an action of the clutch operating device 1 explained above.

As illustrated in FIG. 1, in the power blocked state, the pressure plate 92 is kept in a position away from the clutch disc 94 by the elastic force of the strap plates. In the state, the rotation of the flywheel 91 is not transmitted to the transmission. Therefore, a gear shift action is enabled in the transmission.

In switching the clutch device 9 from the power blocked state to the power transmitted state, the drive motor 21 is configured to drive the clutch lever 27 based on the control signal of the controller 83. Specifically, the ball screw 25 is driven and rotated by the motor main body 23, and the drive unit 31 is upwardly driven so that the angle θ is increased. As a result, the coupling pin 29 and the main rollers 28 are upwardly driven by the drive nut 31, and the link bars 26 are rotated about the pins 39. At this time, the link bars 26 apply tension against the second ends 27b of the clutch lever 27 and the second cover 34 while being stretched between them. Therefore, the main rollers 28 roll on the second cover 34 while being pressed thereto. Simultaneously, the clutch lever 27 is rotated in the counterclockwise direction. At this time, the clutch lever 27 and the link bars 26 function as a toggle mechanism. Therefore, the first directional force, applied to the drive nut 31 by the drive motor 21, is amplified and transmitted to the engaging bearing 97. Further, the pressing force of the assist spring 4 constantly acts on the drive nut 31. Therefore, the pressing force of the assist spring 4 is applied to the main rollers 28 in addition to the first directional force applied to the drive nut 31 by the drive motor 21. Consequently, in engaging the clutch device 9, the load of the drive unit 2 can be reduced while relatively large driving force can be obtained.

Figure 6:
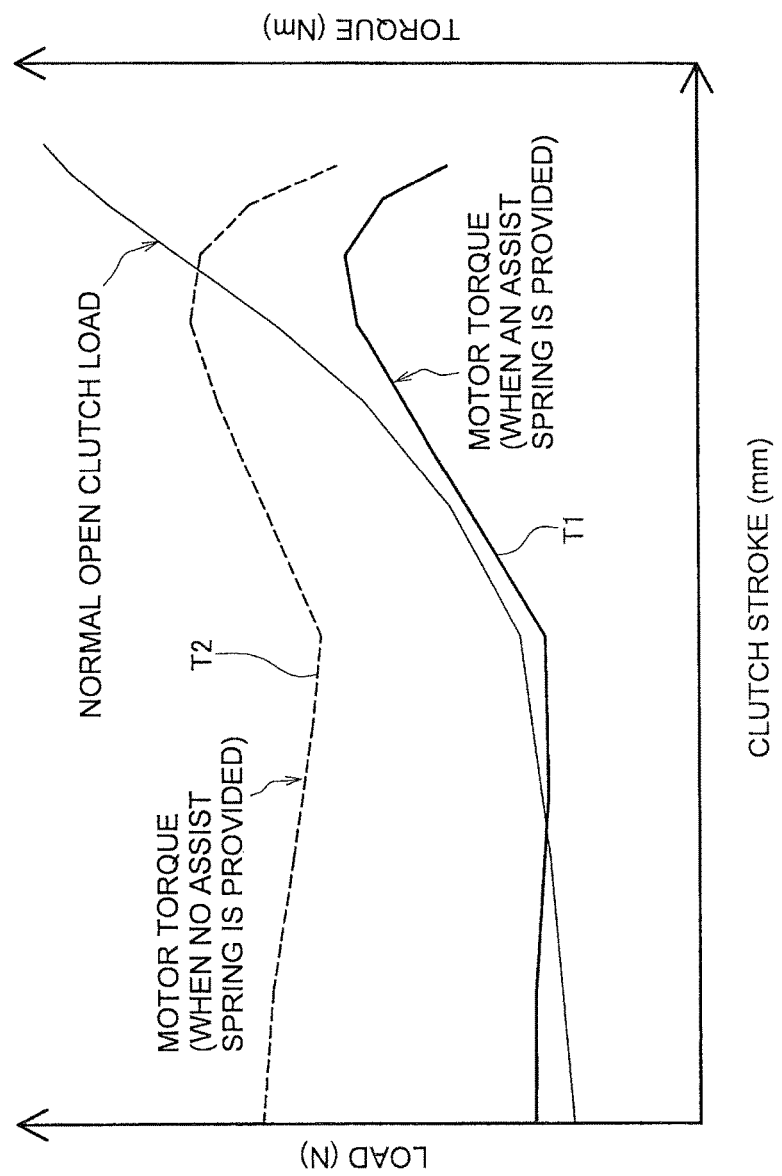
FIG. 6 is a load characteristic diagram of the clutch device 9 and the clutch operating device 1 (the first exemplary embodiment).
Figure 7:
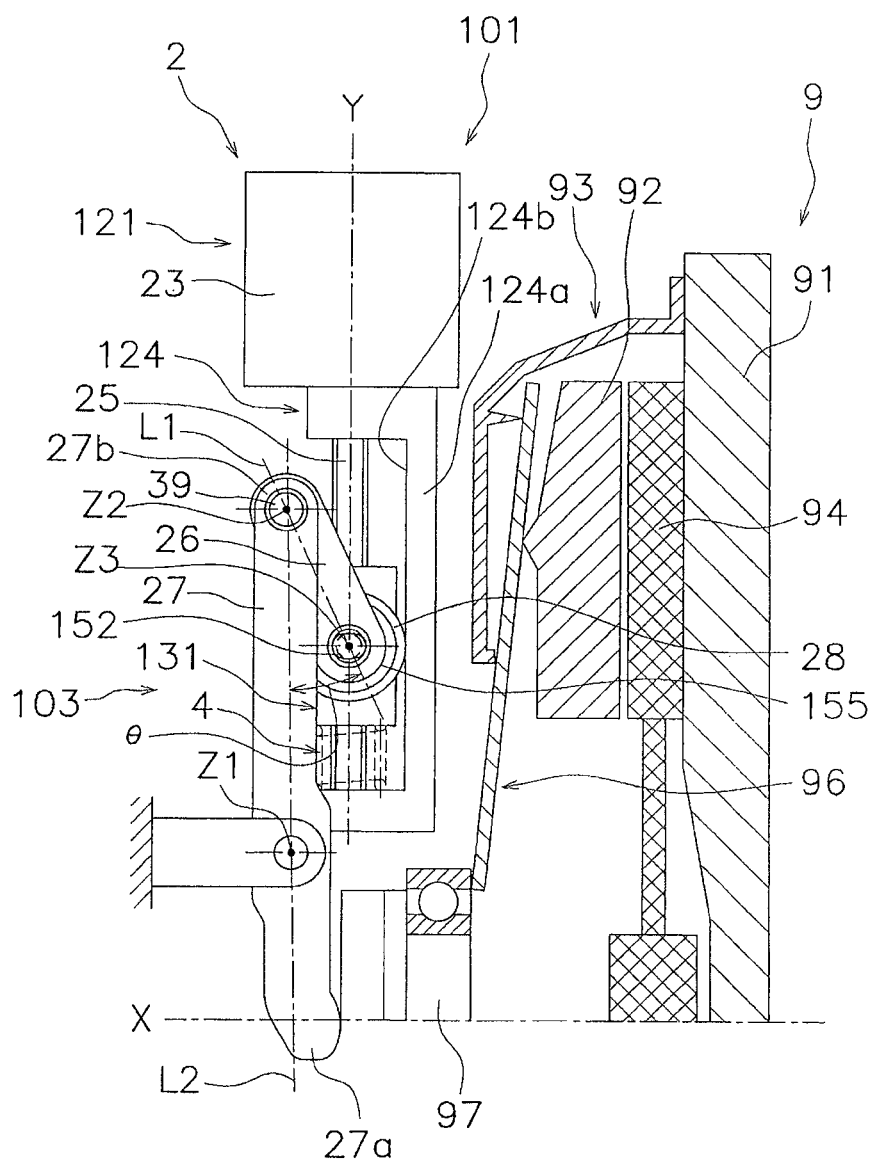
FIG. 7 is a schematic structural view of the clutch device 9 and a clutch operating device 101 (a second exemplary embodiment).
Figure 8:
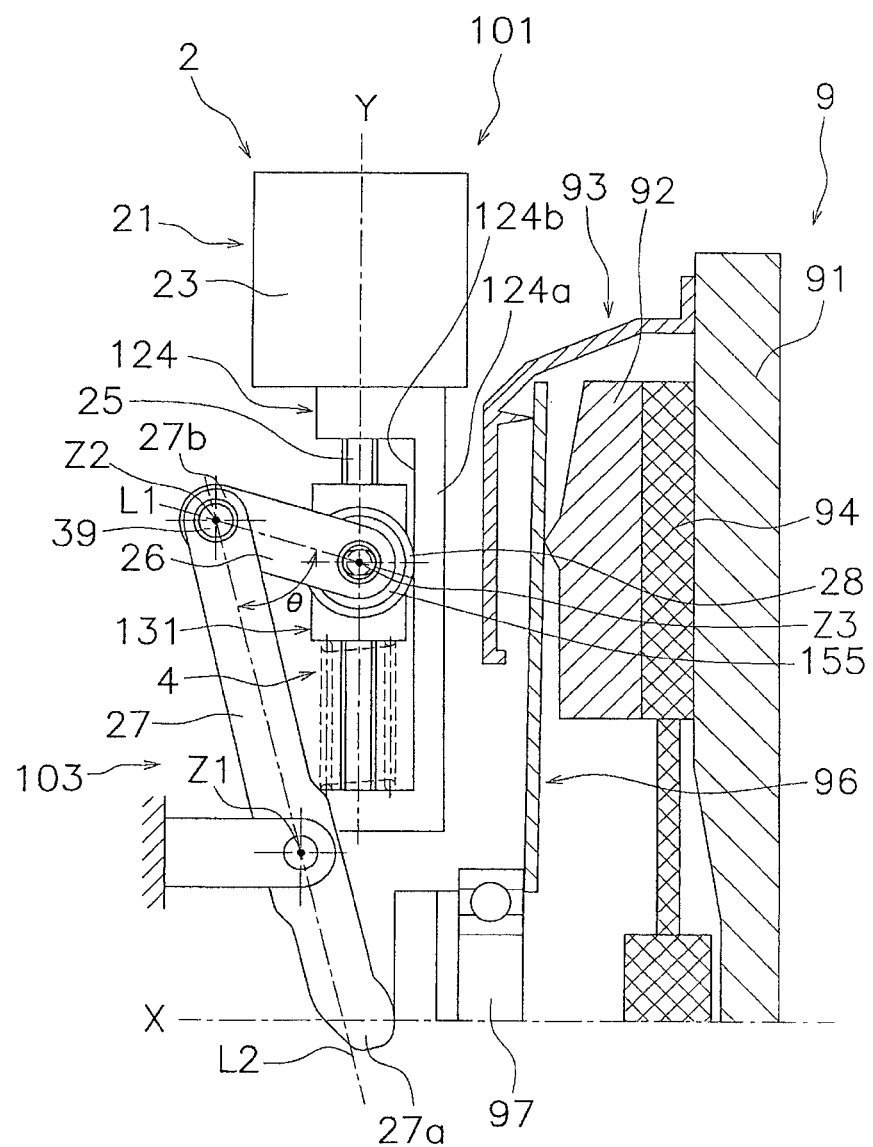
FIG. 8 is a schematic structural view of the clutch device 9 and the clutch operating device 101 (the second exemplary embodiment).

For example, as represented in FIG. 6, in such a normal open type clutch device as the clutch device 9, clutch load (load required for switching the clutch device into the power transmitted state) is gradually increased as the clutch stroke (the displacement of the engaging bearing) is increased, and is acutely increased in the vicinity of the power transmitted state.

However, the driving force of the drive motor 21 is amplified by the speed reduction mechanism 3. Therefore, increase in motor torque of the drive motor 21 can be suppressed as depicted with a curve T1 and a curve T2. Especially, the chart of FIG. 6 indicates that increase in motor torque is suppressed in a region in which clutch load is increased.

Further, the curve T2 represents motor torque where the assist spring 4 is not provided. However, when the assist spring 4 is provided, the entire motor torque can be remarkably reduced as depicted with the curve T1.

In switching the clutch device 9 from the power transmitted state to the power blocked state, the ball screw 25 is driven and rotated by the drive motor 21, and the drive nut 31 is downwardly driven so that the angle θ is reduced. As a result, the coupling pin 29 and the main rollers 28 are downwardly driven by the drive nut 31, and the link bars 26 are rotated about the pins 39 in a direction of reducing the angle θ. Consequently, the link bars 26, stretched between the second end 27b of the clutch lever 27 and the second cover 34, are released from applying tension against them. Accordingly, the main rollers 28 roll on the guide surface 34a of the second cover 34 while being pressed to the second cover 34. Simultaneously, the clutch lever 27 is rotated in the clockwise direction. When the clutch lever 27 is rotated in the clockwise rotation, the engaging bearing 97 is moved in a direction away from the flywheel 91 by the elastic force of the strap plates, and the clutch device 9 is gradually disengaged.

As explained above, in the clutch operating device 1, the speed reduction mechanism 3 employs a toggle mechanism utilizing the main rollers 28. Accordingly, the number of components of the speed reduction mechanism 3 can be reduced in comparison with a well-known speed reduction mechanism, and the structure of the speed reduction mechanism 3 can be simplified. Therefore, according to the clutch operating device 1, manufacturing cost can be reduced while the driving load of the drive unit 2 can be reduced.

Further, the assist spring 4 is herein provided, and therefore, driving load can be remarkably reduced.

[Second Exemplary Embodiment]

Explanation will be hereinafter made for a clutch operating device 101 (an exemplary clutch operating device) according to a second exemplary embodiment. It should be noted that the same reference signs are assigned to elements having substantially the same functions as those in the aforementioned first exemplary embodiment, and the detailed explanation thereof will not be made.

As illustrated in FIG. 1, in the aforementioned first exemplary embodiment, the rotational axis Z3 is arranged closer to the second cover 34 than the rotational axis Y is. However, the rotational axis Z3 may intersect with the rotational axis Y.

Specifically, as illustrated in FIGS. 7 to 10, in the clutch operating device 101 according to the second exemplary embodiment, a drive motor 121 (an exemplary drive actuator) includes the motor main body 23, the ball screw 25, a drive nut 131 (an exemplary driven member) and a motor case 124 (an exemplary support member). Further, a speed reduction mechanism 103 (an exemplary speed reduction mechanism) is provided for amplifying force transmitted thereto from the drive nut 131, and includes the clutch lever 27, a pair of the link bars 26, a pair of inner races 150 (an exemplary coupling member), a plurality of bearings 160 and a pair of rollers 128 (an exemplary roller member).

Figure 9:
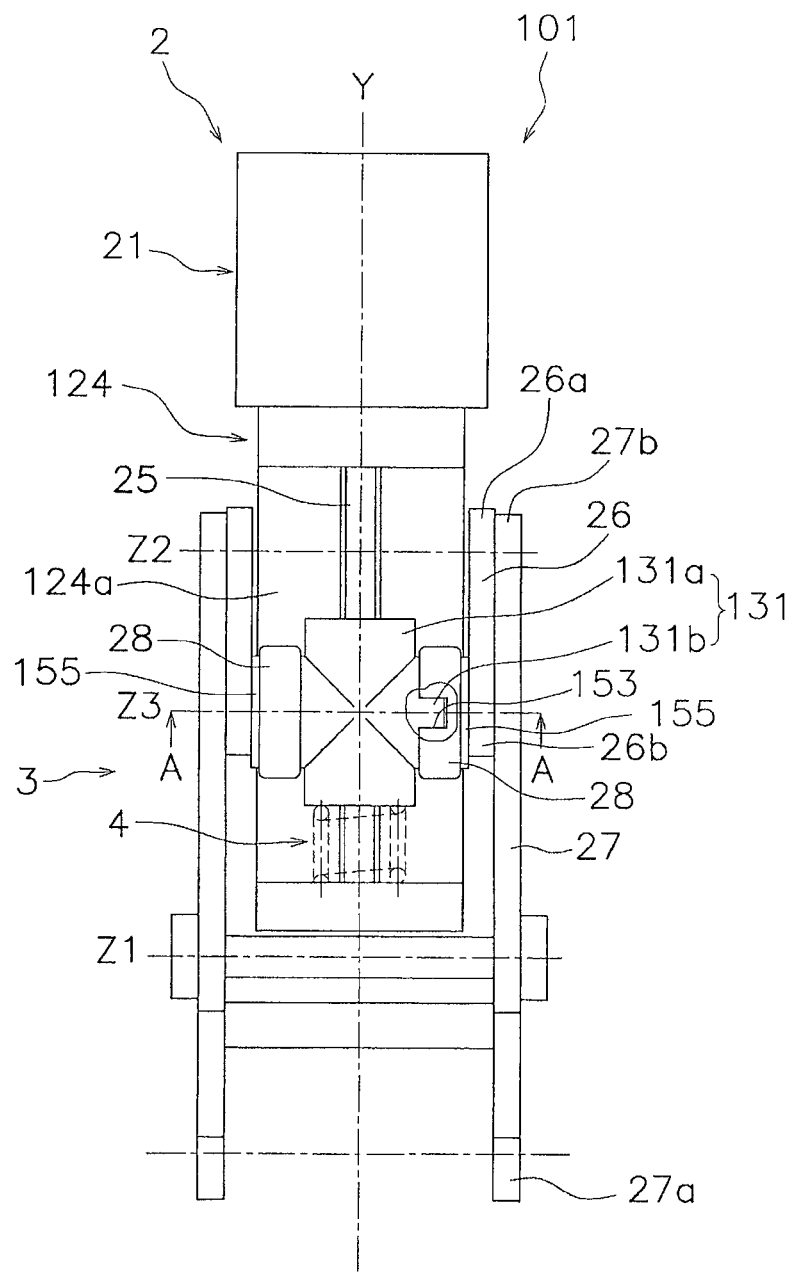
FIG. 9 is a plan view of the drive unit 2 (the second exemplary embodiment).
Figure 10:
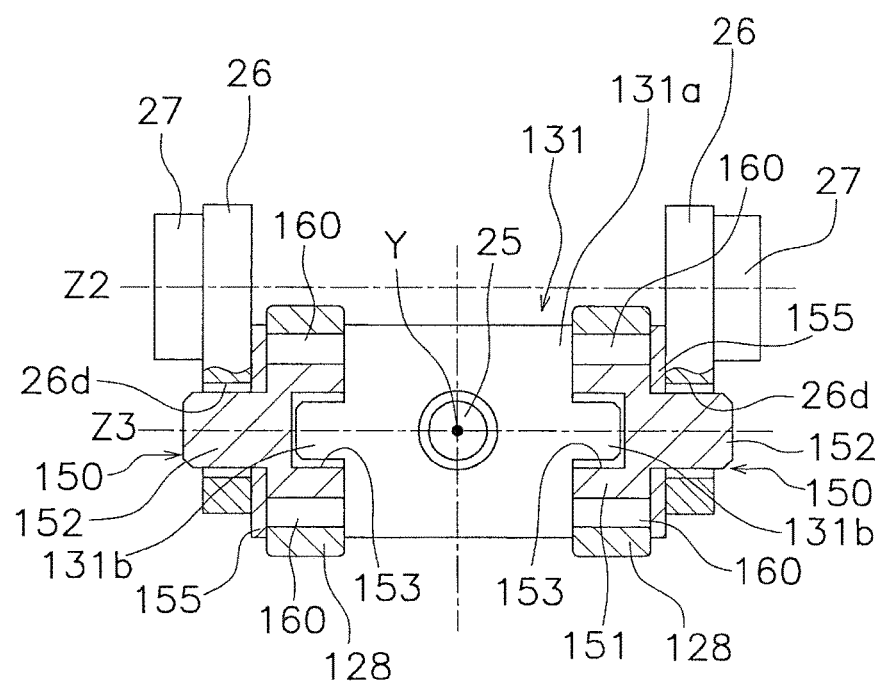
FIG. 10 is a cross-sectional view of FIG. 9 taken along a line A-A.

As illustrated in FIGS. 9 and 10, the drive nut 131 has: a main body 131 a screwed onto the ball screw 25; and a pair of shaft portions 131b laterally protruding from the main body 131a. The shaft portions 131b are protruding in directions arranged in parallel to the rotational axis Z1. Each inner race 150 has a cylinder portion 151 and a pin portion 152. Each shaft portion 131b is inserted into an aperture 153 of each cylindrical portion 151. As illustrated in FIG. 10, each aperture 153 is a slotted hole axially elongated. The inner surface of each aperture 153 makes contact with each shaft portion 131b in the first direction without making contact therewith in the axial direction. Accordingly, the ball screw 25 can be prevented from being deflected when axial force acts on the ball screw 25. Each pin portion 152 is protruding from each cylindrical portion 151 in a direction arranged in parallel to the rotational axis Z1, and is inserted into an aperture 26d of each link bar 26.

Each roller 128 is disposed on the outer peripheral side of each cylindrical portion 151. The rollers 128 make contact with a guide surface 124b of a guide plate 124a of the motor case 124. The rollers 128 are disposed such that they can roll on the guide surface 124b of the guide plate 124a in the first direction. The plural bearings 160 are rotatably disposed between each cylindrical portion 151 and each roller 128. Each roller 128 is rotatably supported by each inner race 150 through the plural bearings 160. A retainer washer 155 is interposed between each cylindrical portion 151 and each link bar 26. The bearings 160 are prevented from coming off by each retainer washer 155.

Similarly to the aforementioned clutch operating device 1 according to the first exemplary embodiment, even the clutch operating device 101 explained above can achieve reduction in manufacturing cost, and simultaneously, can achieve reduction in driving load of the drive unit 2.

[Third Exemplary Embodiment]

Explanation will be hereinafter made for a clutch operating device 201 (an exemplary clutch operating device) according to a third exemplary embodiment. It should be noted that the same reference signs are assigned to elements having substantially the same functions as those in the aforementioned first and second exemplary embodiments, and the detailed explanation thereof will not be made.

In the aforementioned first exemplary embodiment, the angle θ formed by the straight lines L1 and L2 is an acute angle. However, such a case can be considered that the angle θ is an obtuse angle.

Figure 11:
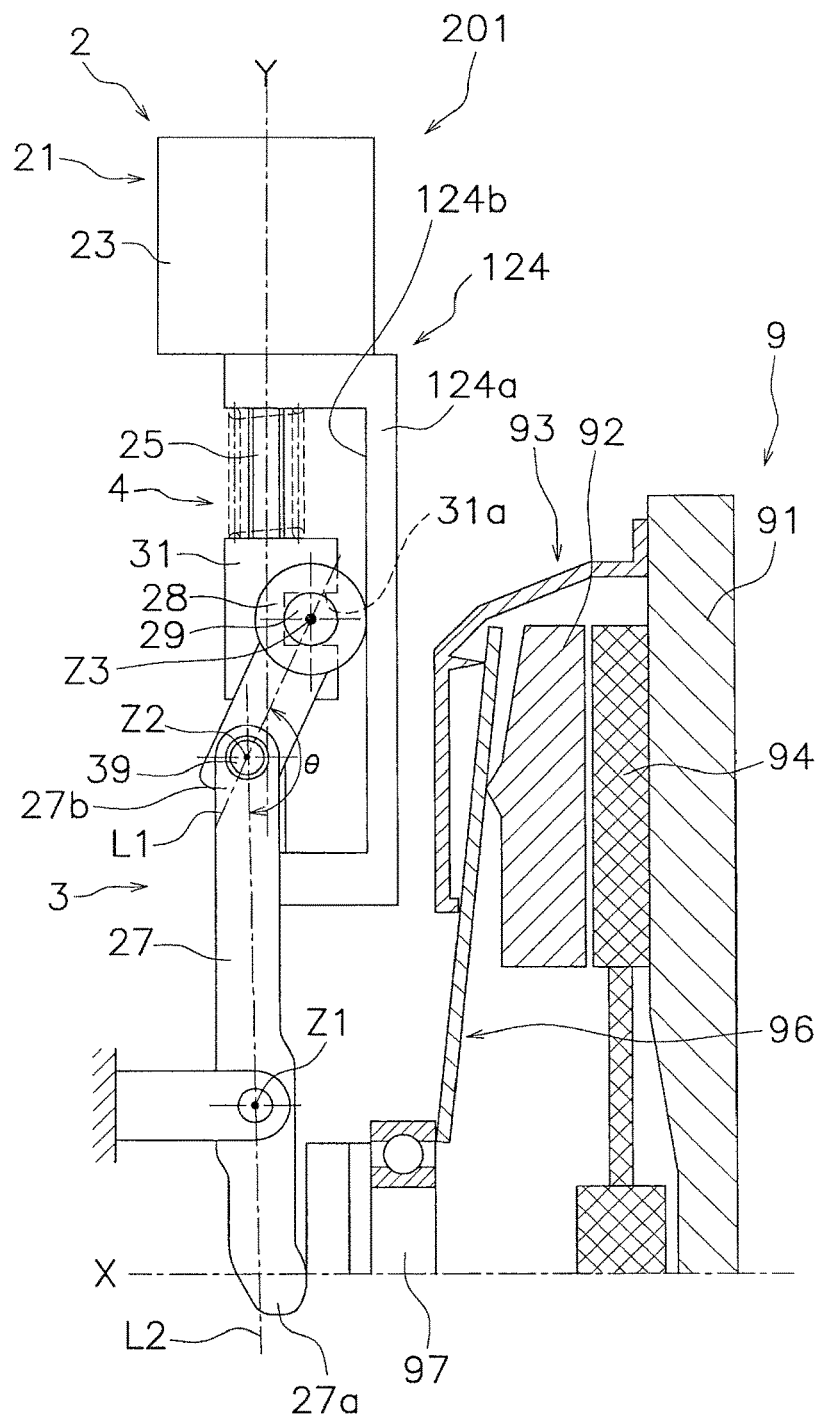
FIG. 11 is a schematic structural view of the clutch device 9 and a clutch operating device 201 (a third exemplary embodiment).
Figure 12:
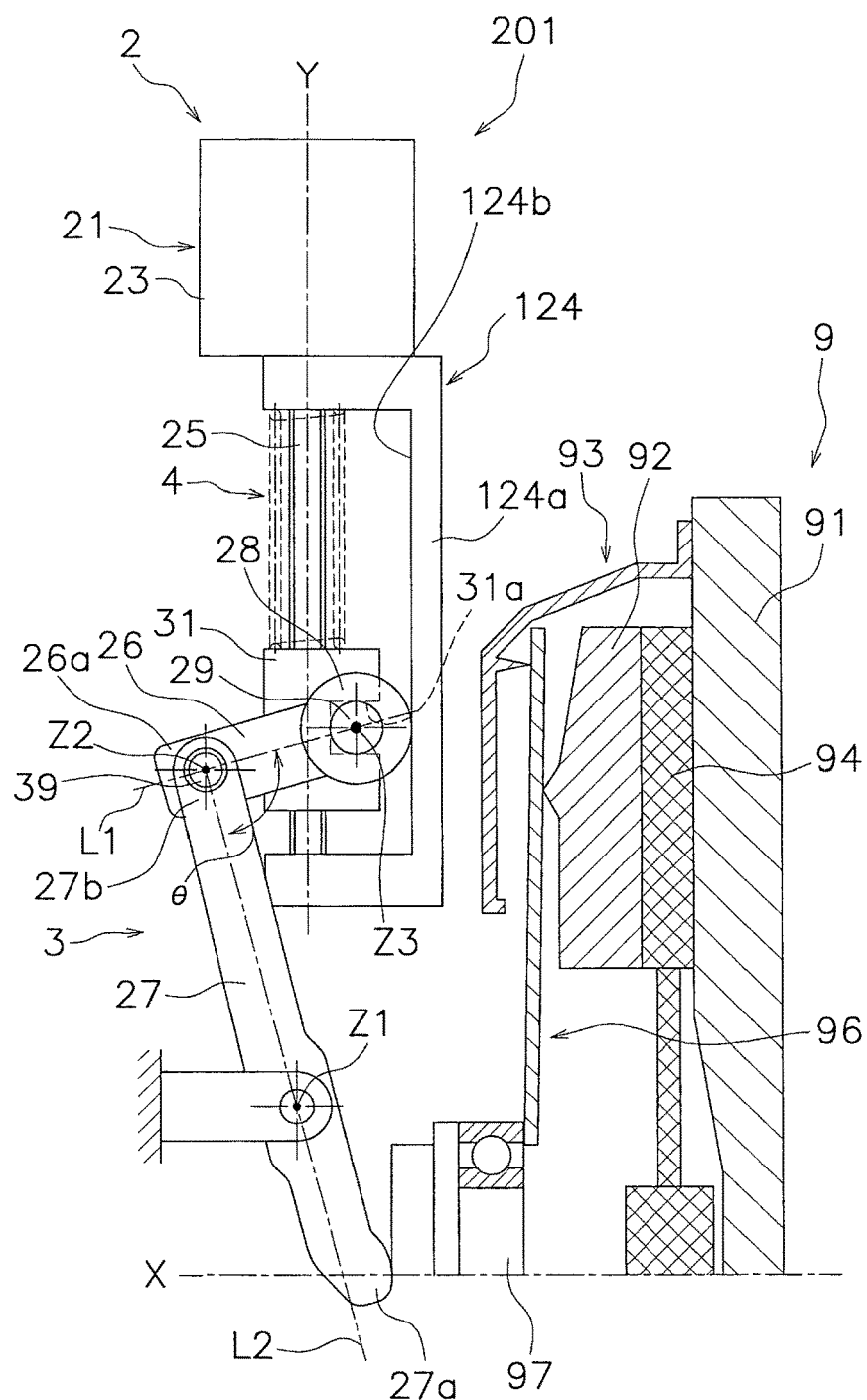
FIG. 12 is schematic structural view of the clutch device 9 and the clutch operating device 201 (the third exemplary embodiment).

Specifically, as illustrated in FIGS. 11 and 12, in the clutch operating device 201 according to the third exemplary embodiment, the rotational axis Z3 is disposed farther away from the rotational axis Z1 than the rotational axis Z2 is, and the angle θ is set to be greater than 90 degrees. In accordance with this, the assist spring 4 is disposed on the upper side of the drive nut 31 (in a position farther away from the rotational axis Z1 than the rotational axis Z2 is). The coupling pin 29 is inserted into the recess 31a of the drive nut 31. The rotational axis Z3 is disposed closer to the guide plate 124a than the rotational axis Y is.

Similarly to the aforementioned clutch operating device 1 according to the first exemplary embodiment, even the clutch operating device 201 explained above can achieve reduction in manufacturing cost, and simultaneously, can achieve reduction in driving load of the drive unit 2.

[Fourth Exemplary Embodiment]

Explanation will be hereinafter made for a clutch operating device 301 (an exemplary clutch operating device) according to a forth exemplary embodiment. It should be noted that the same reference signs are assigned to elements having substantially the same functions as those in the aforementioned first to third exemplary embodiments, and the detailed explanation thereof will not be made.

In the aforementioned second exemplary embodiment, the angle θ formed by the straight lines L1 and L2 is an acute angle. However, similarly to the third exemplary embodiment, such a case can be considered that the angle θ is an obtuse angle.

Figure 13:
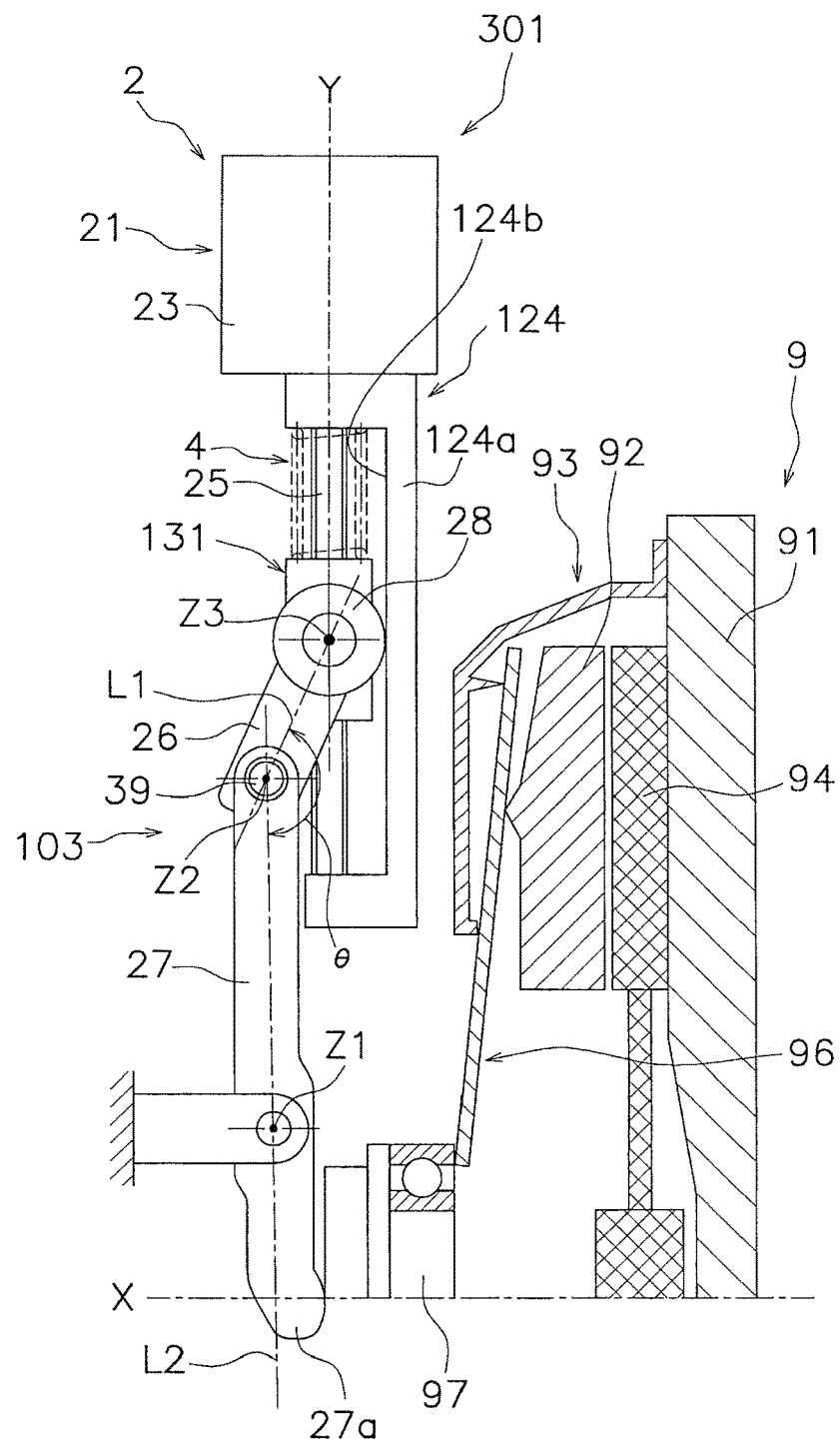
FIG. 13 is a schematic structural view of the clutch device 9 and a clutch operating device 301 (a fourth exemplary embodiment).
Figure 14:
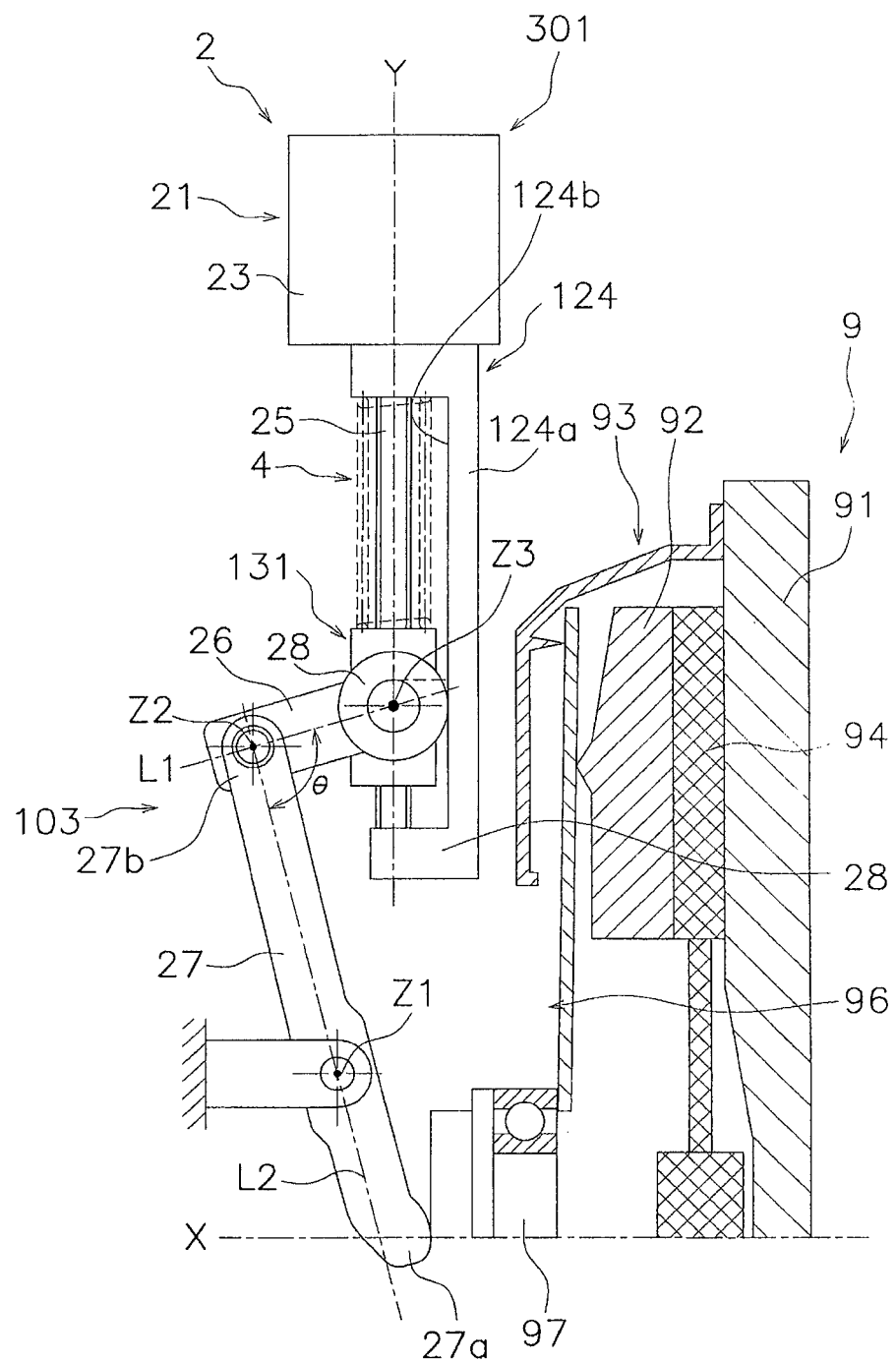
FIG. 14 is a schematic structural view of the clutch device 9 and the clutch operating device 301 (the fourth exemplary embodiment).

Specifically, as illustrated in FIGS. 13 and 14, in the clutch operating device 301 according to the fourth exemplary embodiment, the rotational axis Z3 is disposed in a position farther away from the rotational axis Z1 than the rotational axis Z2 is, and the angle θ is set to be greater than 90 degrees. In accordance with this, the assist spring 4 is disposed on the upper side of the drive nut 131 (in a position farther away from the rotational axis Z1 than the rotational axis Z2 is).

Similarly to the aforementioned clutch operating device 1 according to the first exemplary embodiment, even the clutch operating device 301 explained above can achieve reduction in manufacturing cost, and simultaneously, can achieve reduction in driving load of the drive unit 2.

[Other Exemplary Embodiments]

The specific structure of the present invention is not limited to those of the aforementioned exemplary embodiment, and a variety of changes and modifications can be made without departing from the scope of the present invention.

(A) In the aforementioned exemplary embodiments, the clutch device has been explained by exemplifying the clutch device 9. However, the structure of the clutch device is not limited to those of the aforementioned exemplary embodiments. The aforementioned technology is applicable to any clutch devices as long as they are of a normal open type. For example, a twin clutch using two clutch discs can be considered as the clutch device.

(B) In the aforementioned exemplary embodiment, the drive unit has been explained by exemplifying the drive unit 2. However, the structure of the drive unit for generating driving force is not limited to those of the aforementioned exemplary embodiments. For example, another actuator such as a hydraulic cylinder may be employed as the drive unit.

Further, the arrangement of the drive unit is not limited to that of the drive unit 2. For example, the drive unit 2 may be installed in a horizontal position not in a vertical position, or alternatively, may be installed in another position.

(C) The structure of the speed reduction mechanism 3 is not limited to those of the aforementioned exemplary embodiments. For example, the number of the main rollers 28 may be one, or alternatively, may be three or more. Further, two or more auxiliary rollers 30 may be provided, or alternatively, no auxiliary roller 30 may be provided. Further, the number of the link bars 26 may be one.

(D) In the aforementioned exemplary embodiment, the drive unit 2 includes the assist spring 4 functioning as an elastic member. However, the assist spring 4 may not be provided.

(E) The clutch lever 27 makes contact with the clutch device 9. However, another transmission mechanism for transmitting operating force may be disposed between the clutch lever 27 and the engaging bearing 97. For example, a hydraulic system for transmitting operating force may be disposed between the clutch lever 27 and the engaging bearing 97.

(F) In the aforementioned exemplary embodiments, the main rollers 28 make contact with the second cover 34. However, a member that the main rollers 28 make contact is not limited to the second cover 34.

(G) In the first exemplary embodiment, the clutch lever 27 is rotatably supported by the motor case 24. However, as described in the second to fourth exemplary embodiments, the clutch lever 27 may be rotatably supported by, for instance, the transmission case.

INDUSTRIAL APPLICABILITY

The present invention is widely applicable to a clutch operating device for operating a clutch device.

Advantageous Effects of Invention

In the clutch operating device, when the driving force of the drive part is transferred to the first link member, the first link member is rotated while the roller member rolls on the guide part. At this time, the second link member is pressed by the first link member and is accordingly rotated. Thus, the driving force generated by the drive part is amplified by the speed reduction mechanism and is outputted from the second link member. Therefore, the driving load of the drive part can be reduced.

Further, the roller member and the guide part are herein used. Therefore, the number of components can be reduced, and this enables reduction of manufacturing cost.

Thus, the clutch operating device of the present invention can reduce manufacturing cost, and simultaneously, can reduce driving load.

The invention claimed is:

1. A clutch operating device for operating a clutch device, comprising:
   a drive part including a guide part, the drive part being configured to generate a driving force, the guide part having a substantially flat guide surface; and
   a speed reduction mechanism being a toggle mechanism being configured to amplify the driving force of the drive part,
   the speed reduction mechanism including
      a first link member being configured to receive the driving force of the drive part, the first link member having first and second ends,
      a second link member being rotatably coupled to the first end of the first link member about a first rotational axis extending through the first and second link members, the second link member being rotatably arranged with respect to the guide part, and the second link member contacting the clutch device, and
      a roller member being rotatably fixed to the second end of the first link member, the roller member being disposed to roll on the guide part,
   a rotational axis of the roller member being substantially parallel to the first rotational axis about which the first link member is rotatably coupled to the second link member, a line intersecting the first rotational axis and the roller member rotational axis is not parallel to the guide surface.

2. The clutch operating device recited in claim 1, wherein the drive part includes
   a drive actuator being configured to generate the driving force,
   a support member to which the drive actuator is fixed, the support member having the guide part, and
   a driven member configured to be driven in a first direction by the drive actuator.

3. The clutch operating device recited in claim 2, wherein the guide surface being disposed substantially in parallel to the first direction, and
   the guide surface is configured to make contact with the roller member.

4. The clutch operating device recited in claim 3, wherein the speed reduction mechanism includes a coupling member,
   the coupling member is configured to rotatably couple the first link member and the roller member,
   the driven member is configured to make contact with the coupling member in the first direction, and
   the driven member being disposed away from the coupling member through a clearance in a second direction perpendicular to the guide surface.

5. The clutch operating device recited in claim 2, wherein the second link member is rotatably supported by the support member.

6. The clutch operating device recited in claim 2, wherein the drive actuator includes
   a motor main body being configured to generate a rotational driving force, where the motor main body is fixed to the support member and
   a ball screw configured to be driven and rotated by the motor main body, and
   the rotational axis of the roller member is disposed closer to the guide part than to a rotational axis of the ball screw.

7. The clutch operating device recited in claim 2, wherein the drive actuator includes
   a motor main body being configured to generate a rotational driving force, where the motor main body fixed to the support member, and
   a ball screw being configured to be driven and rotated by the motor main body, and
   the rotational axis of the roller member intersects with a rotational axis of the ball screw.

8. The clutch operating device recited in claim 1, wherein the first link member is coupled to the second link member to be rotatable about the first rotational axis, and
   the second link member is disposed to be rotatable about a second rotational axis.

9. The clutch operating device recited in claim 8, wherein the rotational axis of the roller member is disposed closer to the second rotational axis than to the first rotational axis.

10. The clutch operating device recited in claim 8, wherein
   the rotational axis of the roller member is disposed further away from the second rotational axis than from the first rotational axis.

11. The clutch operating device recited in claim 1, further comprising
   an elastic member being configured to apply a pressing force to the speed reduction mechanism in a direction in which the clutch device is engaged.

12. The clutch operating device recited in claim 1, further comprising
   the first link member is coupled to the second link member by a pin member extending along the first rotational axis.

* * * * *